US012335059B1

(12) United States Patent
Boucheron et al.

(10) Patent No.: US 12,335,059 B1
(45) Date of Patent: Jun. 17, 2025

(54) ENRICHING EVENT ASSETS FOR VIDEO CONFERENCES VIA AGGREGATING CONTENT IN A LIFECYCLE OF A VIDEO CONFERENCE

(71) Applicant: Zoom Video Communications, Inc., San Jose, CA (US)

(72) Inventors: Cécile Boucheron, Brooklyn, NY (US); Michelle Frances Koike, Sausalito, CA (US); Cullen Wong, San Francisco, CA (US); Edwin Yeary, Orinda, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/228,404

(22) Filed: Jul. 31, 2023

(51) Int. Cl.
*H04L 12/18* (2006.01)
*H04L 65/1093* (2022.01)

(52) U.S. Cl.
CPC ...... *H04L 12/1818* (2013.01); *H04L 12/1831* (2013.01); *H04L 65/1093* (2013.01)

(58) Field of Classification Search
CPC ............. H04L 12/1818; H04L 12/1831; H04L 65/1093
See application file for complete search history.

(56) References Cited

U.S. PATENT DOCUMENTS

| 10,810,553 | B2 | 10/2020 | Sexauer et al. |
| 2018/0123814 | A1 | 5/2018 | Sexauer et al. |
| 2019/0116167 | A1* | 4/2019 | Johnson ................ H04L 9/0825 |
| 2023/0092334 | A1* | 3/2023 | Vendrow ............... G06F 40/279 |
| | | | 715/205 |
| 2023/0136777 | A1* | 5/2023 | Kotnis ................ H04L 12/1818 |
| | | | 709/204 |
| 2023/0156052 | A1* | 5/2023 | Zhang ................ H04L 65/4015 |
| | | | 709/205 |

OTHER PUBLICATIONS

U.S. Appl. No. 18/228,386 , "Final Office Action", filed Jun. 18, 2024, 17 pages.
U.S. Appl. No. 18/228,386 , "Non-Final Office Action", filed Jan. 19, 2024, 17 pages.
U.S. Appl. No. 18/228,386, "Filed Application", filed Jul. 31, 2023.
U.S. Appl. No. 18/228,396, Filed Application, filed Jul. 31, 2023.

* cited by examiner

*Primary Examiner* — Brian Whipple
(74) *Attorney, Agent, or Firm* — Kilpatrick Townsend & Stockton LLP

(57) ABSTRACT

Systems and methods for enriching event assets for video conferences via aggregating content in a lifecycle of a video conference are provided. In an example, a computing device associated with a participant of a video conference obtains event information for the video conference inviting multiple participants including the participant. The computing device generates an event card based on the event information and presents the event card in a user interface on the computing device. In response to receiving a command to join the video conference, the computing device joins the video conference. The computing device obtains content exchanged among two or more participants during the video conference and updates the event card presented in the user interface to include the obtained content.

20 Claims, 12 Drawing Sheets

… (US 12,335,059 B1)

ENRICHING EVENT ASSETS FOR VIDEO CONFERENCES VIA AGGREGATING CONTENT IN A LIFECYCLE OF A VIDEO CONFERENCE

CROSS-REFERENCE TO RELATED APPLICATIONS

The present application is related to co-pending U.S. patent application Ser. No. 18/228,386, filed Jul. 31, 2023, titled "Enriching Event Assets for Video Conferences" and co-pending U.S. patent application Ser. No. 18/228,396, filed Jul. 31, 2023, titled Enriching Event Assets for Video Conferences via Chat Communication Groups."

FIELD

The present application generally relates to video conferencing, and more particularly relates to enriching meeting assets for more efficient video conferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
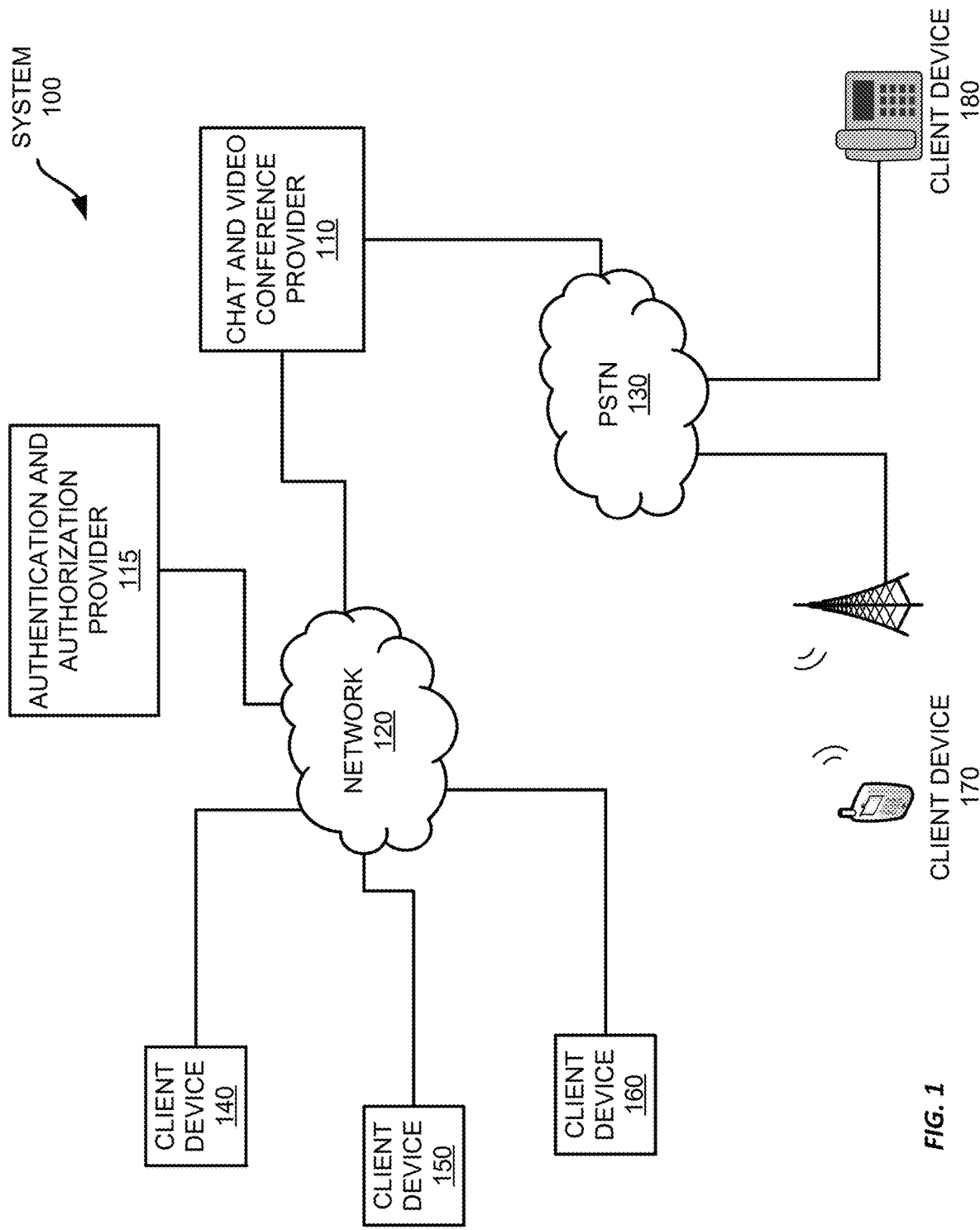
FIG. 1 shows an example system that provides videoconferencing functionality to various client devices, according to certain aspects described herein.

Examples are described herein in the context of systems and methods for enriching meeting assets for video conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

However, it can be challenging to manage the meetings and the associated assets such as files, messages, links, recordings, especially for users with a crowded calendar where multiple meetings are scheduled on a day. As a result, a participant may miss a meeting which may cause the meeting to be delayed, rescheduled, or even cancelled, or may misplace files or content associated with a meeting. In either case, more time and resources have to be spent to fix the issues.

To solve the above problems associated with video conference meetings, example systems and methods for enriching meeting assets for video conferencing are provided herein. As described herein, a client application installed on a client computing device can be configured to obtain event information for a video conference from a calendar service, such as the description of the video conference, the list of invited participants, attachments added when the video conference is scheduled and so on. The client application can further obtain the status information of the video conference which includes the join status of the participants of the video conference from the chat and video conference provider that establishes the video conference. Based on the status information, the client application can generate an event card and present the event card in a user interface to show in real time or near real time to a participant of the conference, before the participant joins the conference, the participants who have joined the conference. In some examples, additional information, such as a live video of the conference may be available to the participant before he or she joins the conference. The event card can serve as a reminder to the participant to join the conference and provides the participant with information prior to the joining.

As the video conference is being conducted, additional content may be exchanged among the participants, such as chat messages, files including documents, images, video, audio, etc. Likewise, if the recording of the video conference is enabled, recordings of the conference is also generated. In some examples, the client application can be configured to further collect the additional content and add them to the event card. For instance, the client application can communicate with a backend server that has access to a data store where the chat messages exchanged during the conference or other content are stored. The client application can add the obtained content to the event card presented in the user interface. In addition, the client application may be configured to parse the chat messages to identify hyperlinks and present the hyperlinks in the event card separately in addition to the chat messages. When the conference is over, the client application can further communicate with the backend server to obtain access information for the meeting recording, such as the link to the meeting recording and a passcode to the recording and present the access information on the event card. In this way, all the information related to the video conference is collected and accessible from the event card.

In some examples, a chat communication group can be created for a video conference inviting the participants of the video conference. The chat communication group can be, for example, a one-on-one chat between two participants, a group chat among the multiple participants or a chat channel that is specific for the topic related to the video conference. In these examples, the client application on the client computing device associated with a participant, such as the host of the video conference, can present the generated event card for the video conference in the chat communication group. For example, the event card can be presented in the chat communication group once a participant joins the conference. The event card can thus be configured to show the participants who has joined the conference. In this way, the participants of the conference can receive the event card in the chat communication group as a prominent reminder to join the meeting. Similar to the examples discussed above, as the conference is conducted, the event card in the chat communication group can be updated to include the content exchanged during the meeting and the link to the recordings of the conference after the meeting is over.

As described herein, certain embodiments provide improvements to video conferencing by solving problems that are specific to online platforms. These improvements include more efficiently presenting the video conference related information such as the participants who have joined the meeting before the user joins, the content associated with the meeting before, during, and after the meeting. These improvements allow the users to access the status of the meeting and the content of the meeting faster than the implementations without the presented technologies. These improvements allow the video conference to be conducted more efficiently, thereby reducing the amount of time and the computing and network resources spent on the video conference.

This illustrative example is given to introduce the reader to the general subject matter discussed herein and the disclosure is not limited to this example. The following sections describe various additional non-limiting examples and examples of systems and methods for enriching meeting assets for video conferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
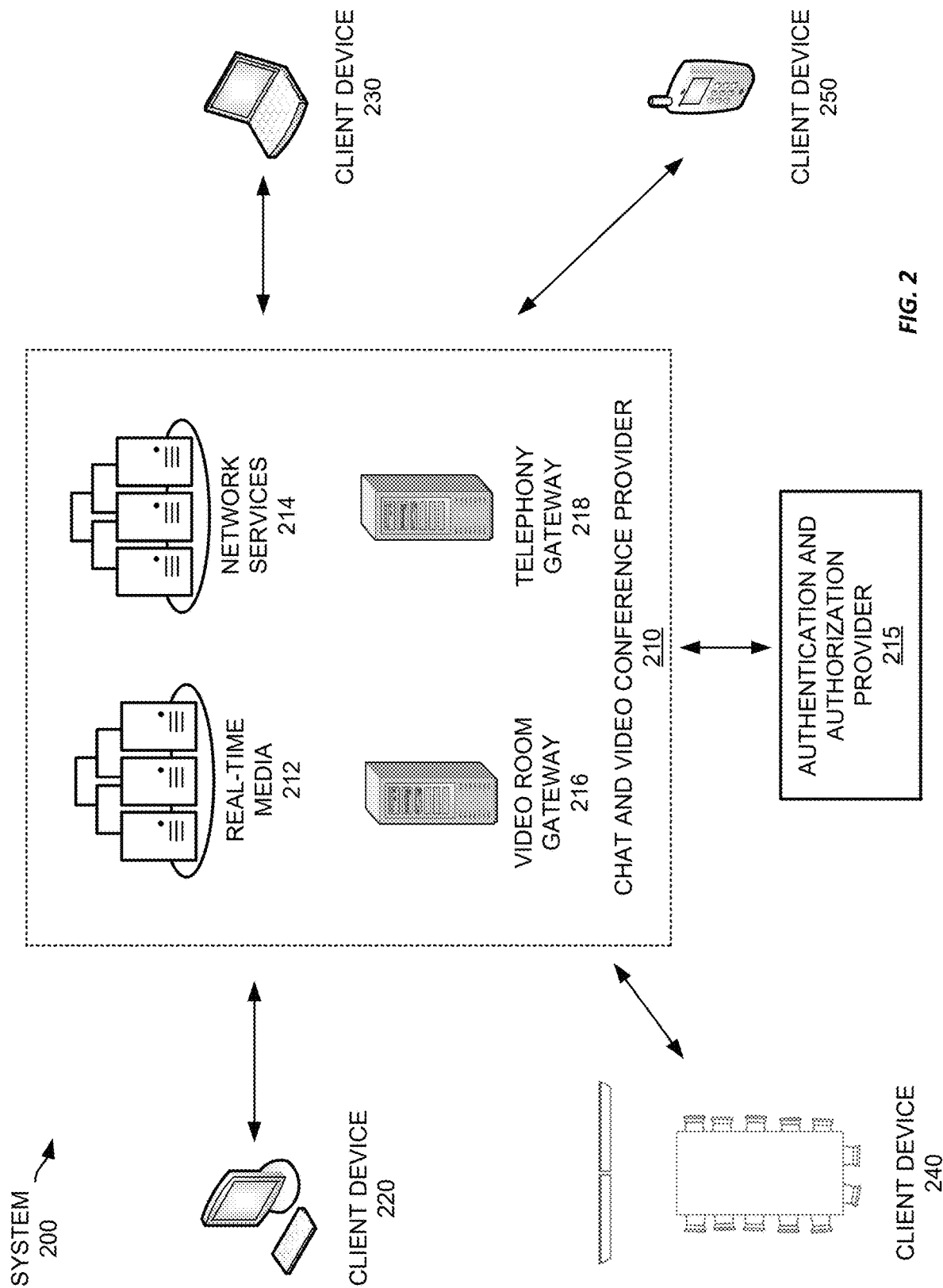
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
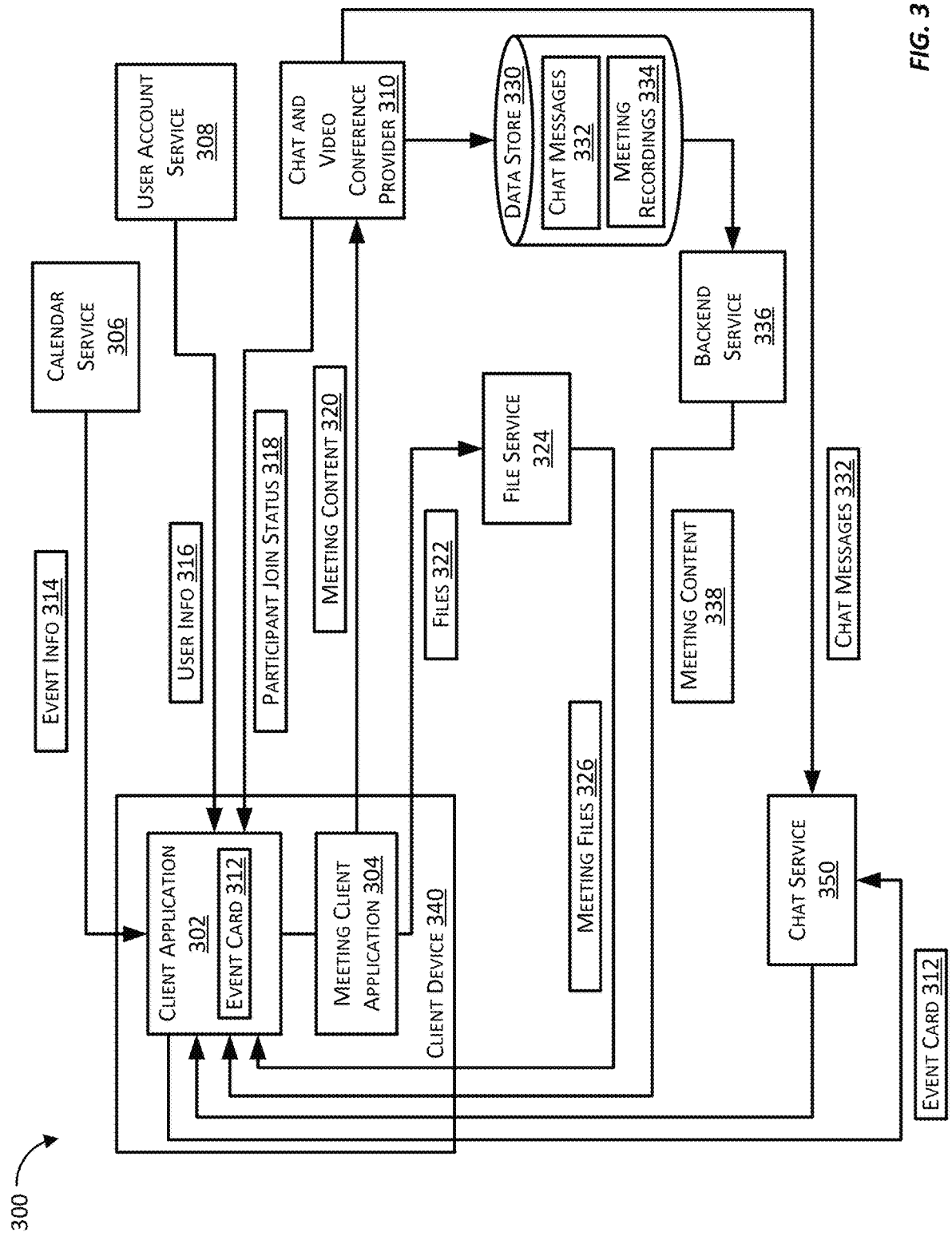
FIG. 3 shows an example of an operating environment for enriching meeting assets for video conferencing, according to certain aspects of the present disclosure.

Referring now to FIG. 3, FIG. 3 shows an example of an operating environment 300 for enriching meeting assets for video conferencing, according to certain aspects described herein. The operating environment 300 includes a chat and video conference provider 310 configured to provide videoconferencing to various client devices 340, such as the chat and video conference providers 110 and 210 described above with respect to FIGS. 1 and 2. The client devices 340 may be the client devices 140-160 and 220-250 described above with respect to FIGS. 1 and 2.

A client device 340 can have a client application 302 installed which is configured to manage various types of communications for a user such as email, calendar, chat, phone, and meetings. The client application 302 may be, for example, Zoom® client, or Microsoft Teams®. When a user joins a video conference from the client application 302, the client application 302 initiates a meeting client application 304 that provides the functionalities of a video conference and handles the communication with the chat and video conference provider 310. The meeting client application 304 may be configured to, for example, obtain audio, video, and other content from the client computing device 340 and transmit them to the chat and video conference provider 310, receive and decode the content from the chat and video conference provider 310 and present the content to the user of the client computing device 340 as described above with respect to FIGS. 1 and 2.

The client application 302 is further configured to generate an event card 312 for an event such as a video conference meeting and present the event card 312 in a user interface of the client application 302. As used herein, an "event card" refers to the data structure that stores the information contained therein as well as the user interface used to present the information. To generate the event card 312, the client application 302 communicates with a calendar service 306, such as Google® calendar service, Microsoft Office 365® calendar service, Zoom® calendar service, where the calendar(s) of the user associated with the client application 302 is managed. The client application 302 can obtain from the calendar service 306 the event information 314 such as the description of the event, attachments associated with the event, the scheduled time of the event, participants of the event, and so on. The event information 314 can further include the respective RSVP responses (e.g., whether a participant has accepted or declined the invitation to attend the meeting) of the invited participants. Based on the event information 314, the client application 302 can determine the expected participants of the video conference. The expected participants can include, for example, the participants who have accepted the meeting invitation or the participants who have not rejected the invitation.

The client application 302 can further obtain the user information of the participants from a user account service 308 configured to maintain user information 316 such as the name of the user, location of the user, contact information of the user and so on. In some examples, the user account service may be provided by the authentication and authorization provider 115 described above with respect to FIG. 1.

With the obtained event information 314 and user information 316, the client application 302 can generate an event card 312 and present the event card 312 in a user interface of the client application 302. In some examples, an event card is generated for each event on the calendar of the user, which may be a video conference meeting or other types of events.

For a video conference meeting event, the event card 312 can be updated to include an indication of the participants who have joined the meeting before all the participants join the meeting. The update of the event card 312 can start once the first participant joins the meeting. The indication can include, for example, an icon of the joined participant or an image of the joined participant. The client application 302 can obtain the join status 318 of the participants from the chat and video conference provider 310. In some examples, the chat and video conference provider 310 pushes the participant join status 318 to the client application 302 whenever there is an update, such as another participant joining the meeting or a participant leaving the meeting. The client application 302 can update the event card 312 presented in the user interface accordingly based on the received updates to the participant join status 318. As a result, the user of the client computing device 340 can view who has joined the meeting even before the user joins the meeting. In further examples, the chat and video conference provider 310 can also send a live video of the meeting to the client computing device 340 which can be presented in the event card 312 in the user interface before the user joins the meeting.

Based on the information in the event card 312, such as who has joined the meeting, the user can decide when to join the meeting. Once the user joins the meeting, the client application 302 can launch the meeting client application 304 to provide the functionality of the video conferencing as discussed above. During the meeting, meeting content 320 such as audio, video, files, chat messages are transmitted from the client device 340 to the chat and video conference provider 310. Likewise, meeting content are also transmitted to the chat and video conference provider 310 by other client devices associated with other participants of the meeting. The chat and video conference provider 310 stores the content such as the chat messages in a data store 330. In some implementations, the chat and video conference provider 310 also stores the meeting recordings 334, such as the video recording and/or audio recording in the data store 330 while in other implementations, the meeting recordings 334 are stored in a different storage system. In additional or alternative implementations, the files exchanged during the meeting are stored in a file service 324 that is separate from the data store 330 so that more protection can be added to the files, such as through advanced encryptions.

As contents are exchanged during the meeting among the participants, the client application 302 can obtain the information of the exchanged content and update the event card 312 to include such information. For example, the client application 302 can communicate with the chat and video conference provider 310 or another server that has access to the meeting content, such as a backend server 336 shown in FIG. 3. The chat and video conference provider 310 or the backend server 336 can provide the meeting content 338 generated or exchanged during the meeting, such as the chat messages 332 to the client application 302. The client application 302 can parse the chat messages 332 to identify hyperlinks and extract the hyperlinks from the chat messages 332. If the files exchanged during the meeting are stored in a separate file service 324, the client application 302 can retrieve the meeting files 326 from the file service 324. The client application 302 can update the event card 312 to include the meeting content and files as well as the extracted hyperlinks and present the updated event card 312 in the user interface.

After the meeting is over and when the meeting recording 334 is available, the client application 302 can further obtain the access information to the meeting recording 334 from, for example, the backend server 336. The client application 302 can further update the event card 312 to include the access information, such as the link to retrieve the meeting recording, passcode to open the meeting recording, and so on.

In some examples, a chat communication group can be created for a video conference with the participants of the video conference as the members of the chat communication group. This can be achieved by selecting the option for creating the chat communication group when the host schedules the video conference. The chat communication group can be, for example, one-on-one chat for two participants, a group chat among the multiple participants, or a chat channel that is specific for the topic related to the video conference. Chat channels allow private or public groups to be created where a member can send messages, files, images, and start an instant meeting with channel members. These channels generally serve as longer-term collaboration forums, such as specific teams, channels serving a specific purpose or topic (Ask IT, for example), and announcement channels, and can be set up for recursive meetings. In some examples, a chat channel can be a private chat channel or a public chat channel. Private channels cannot be searched for and found by users who are not already a member of the channel; current members of the channel can add those other members to give them access. Public channels can be made searchable and joinable by all members of an organization, and all members of the organization need no special invitation to join, but they can be added to the channel by current members as well.

In these examples, the client application 302 on the client computing device 340 associated with a participant, such as the host of the video conference, can present the generated event card 312 for the video conference in the chat communication group. For example, the event card 312 can be presented in the chat communication group once a participant joins the conference. The presented event card 312 in the chat communication group can be transmitted to a chat service 350 which will broadcast the event card 312 to the members of the chat communication group. Similar to the examples described above, the event card 312 can be configured to show the participants who has joined the conference before all the expected participants join the conference. In this way, the participants of the conference can receive the event card in the chat communication group as a reminder to join the meeting. As the conference is being conducted, the event card 312 in the chat communication group can be updated to include the content exchanged during the meeting and the link to the recordings of the conference after the meeting is over. In addition, chat messages 332 sent during the video conference through the meeting client application 304 can also be pushed to the chat service 350 for broadcasting in the chat communication group created for the video conference.

Note that while FIG. 3 only illustrates one client device 340, multiple client devices may implement similar technology described herein to generate, update, and present respective event cards in the user interfaces of the respective client devices. Further, the various services shown in FIG. 3 are for illustrative purposes only and should not be construed as limiting. Various other services and other arrangements can also be employed to implement the technology described herein.

Figure 4:
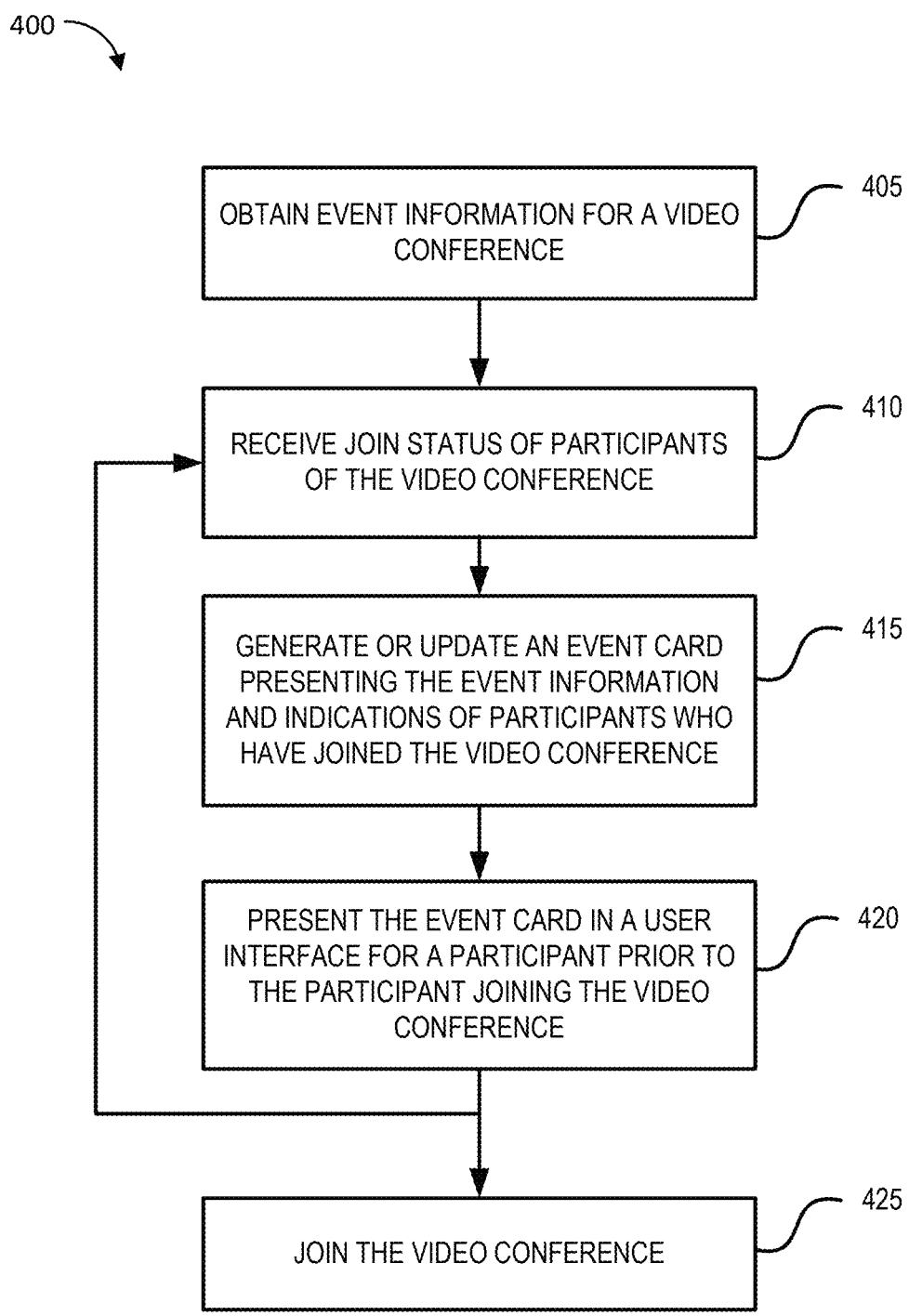
FIG. 4 shows a flowchart of an example process for showing joining status of participants of a meeting before a participant joins the meeting, according to certain aspects of the present disclosure.

Referring now to FIG. 4, FIG. 4 shows a flowchart of an example process 400 for showing joining status of participants of a video conference before a participant joins the conference, according to certain aspects of the present disclosure. The client device 340 can be configured to implement operations depicted in FIG. 4 by executing suitable program code (e.g., the client application 302 and/or the meeting client application 304). The software or program code may be stored on a non-transitory storage medium (e.g., on a memory device). The process depicted in FIG. 4 and described below is intended to be illustrative and non-limiting. Although FIG. 4 depicts the various processing blocks occurring in a particular sequence or order, this is not intended to be limiting. In certain alternative embodiments, the blocks may be performed in some different order, or some blocks may also be performed in parallel. For illustrative purposes, the process 400 is described with reference to certain examples depicted in the figures. Other implementations, however, are possible. FIG. 4 will be described in conjunction with FIG. 5.

At block 405, the process 400 involves obtaining event information 314 for a video conference. The event information 314 can be obtained from the calendar service 306 and includes information such as the description of the event, attachments associated with the event, the scheduled time of the event, participants of the event, and so on. The event information 314 can further include the respective RSVP responses (e.g., whether a participant has accepted or declined the invitation to attend the meeting) of the invited participants. Based on the event information 314, the client application 302 can determine the expected participants of the video conference. The expected participants can be determined to include, for example, the participants who have accepted the meeting invitation or the participants who have not rejected the invitation. For each of the participants, the client device 340 can further obtain the user information such as the name of the participant, location of the participant, contact information of the participant and so on.

At block 410, the process 400 involves receiving participant join status 318. The client device 340 can obtain the join status 318 of the participants from the chat and video conference provider 310. In some examples, the chat and video conference provider 310 pushes the participant join status 318 to the client application 302 whenever there is an update, such as when a participant joins the meeting, or a participant leaves the meeting. In other examples, the chat and video conference provider 310 pushes the participant join status 318 to the client device 340 periodically, such as every minute.

At block 415, the process 400 involves generating an event card 312 or updating an existing event card 312 for the video conference to include the event information and an indication of the participants who have joined the meeting before all the participants or the expected participants join the meeting. The generation or update of the event card 312 to include the indication of the joined participants can start once the first participant joins the meeting. The indication can include, for example, an icon of the joined participant or an image of the joined participant. In some examples, the client device 340 may further receive a live video of the meeting from the chat and video conference provider 310 which can be presented in the event card 312 in the user interface before the user joins the meeting.

Figure 5:
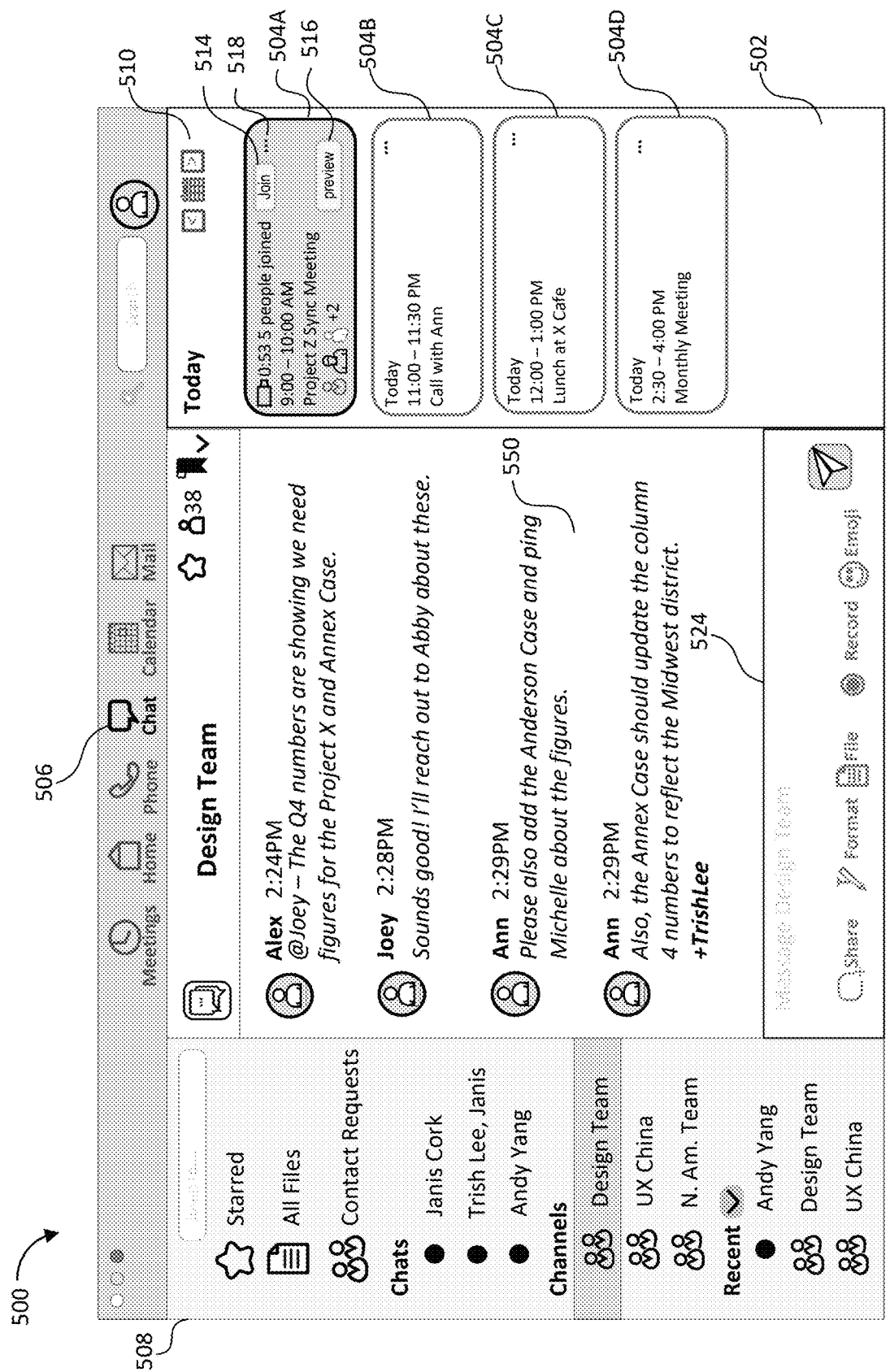
FIG. 5 shows an example of a user interface presented on a computing device associated with a participant of a video conference for presenting the joining status of participants of the video conference before the participant joins the video conference, according to certain aspects of the present disclosure.

At block 420, the process 400 involves presenting the event card 312 in a user interface on the client device 340 prior to a participant associated with the client device 340 joins the meeting. FIG. 5 shows an example of a graphical user interface ("GUI") 500 presented by the client application 302 on a client device 340 associated with a participant of a video conference for presenting the joining status of participants of the video conference before the participant joins the video conference. The GUI 500 provides access to a variety of functionalities, including calendar, chat, phone, emails, meetings, and so on. FIG. 5 shows the user interface for the chat functionality 506, which includes a sidebar 508, a chat messaging panel 550, and a message composure panel 524. The sidebar 508 may include one or more chat related headings, such as a "Chats" heading, a "Channels" heading, and a "Recent" heading. The "Chats" heading may include one-on-one chats or group chats. The "Channels" heading is for chat channels.

The client device may transmit chat messages to the chat service 350, which may in turn transmit the messages to the client devices associated with the other members of the chat communication group. Upon transmission of the messages, the messages may be published within a chat messaging panel 550. Messages exchanged within a chat communication group may include text messages, files, such as documents, images, vidoes or audios. As will be discussed below, the chat message may also include an event card.

The GUI 500 shown in FIG. 5 also includes a side bar 522 for displaying event cards 504A-504D. Each of the event cards 504 shows the description of the event, such as a meeting, a call, the time scheduled for the event, and so on. Among the event cards 504A-504D, event cards 504A and 504D are for events associated with a video conference and the other two event cards are for events without a video conference. As shown in FIG. 5, the event card 504A shows the participants who have joined the meeting even before the participant associated with the client device has not joined the meeting. In this example, the event card 504A shows that five participants have joined the meeting and the respective icons of the five participants. In addition, the event card 504A also shows the time since the start of the meeting (e.g., since the first participant joins the meeting). The event card 504 further shows a preview button 516 which is configured to show a preview of the video of the meeting when activated. To provide the preview of the video, the client application 302 can request the chat and video conference provider 310 to stream the video and audio signal of the ongoing video conference to the client device 340, either through the meeting client application 304 or directly to the client application 302. Since the participant associated with the client device 340 has not joined the meeting, the chat and video conference provider 310 may need to authenticate the client application 302 before providing the preview of the video and audio of the conference, such as through the authentication and authorization provider 115 as discussed above.

The event card 504 further includes a user interface control 518 configured to show more details about the event when activated, such as the full description of the event, the link to the meeting, the list of participants, and so on. The event card 504A also includes a join button 514 which allows the user to join the meeting by clicking on it. For example, when the join button 514 is clicked on, the client application 302 receives a command to join the video conference and subsequently invoke the meeting client application 304 to establish the connection with the chat and video conference provider 310 to join the meeting.

The side bar 502 shown in FIG. 5 is configured to display all the events on the current day. A user can select a different day to view the events on that day by clicking on the group of user interface controls 510. In some implementations, the side bar 502 remains in the GUI 500 when the user switches between the tabs for different functionalities, such as the email tab, the phone tab, the calendar tab, or the home tab. In this way, the user is always reminded about the upcoming meeting and the joining status of the meeting.

Referring back to FIG. 4, the process 400 involves repeating blocks 410-420 each time an update of the participant join status is received. At block 425, the process 400 involves joining the video conference. Based on the information in the event card 312, such as who has joined the meeting, the user of the client device 340 may decide to join the meeting, such as by clicking on the join button 514 on the event card. Once the user requests to join the meeting, the client application 302 can launch the meeting client application 304 to provide the functionality of the video conferencing as discussed above. In some implementations, the client device 340 stops updating the event card 312 once the user associated with the client device 340 joins the meeting. In other implementations, the event card 312 will be updated until all the expected participants join the meeting or when the host closes the meeting for joining (i.e., no more participants are allowed to join).

Figure 6:
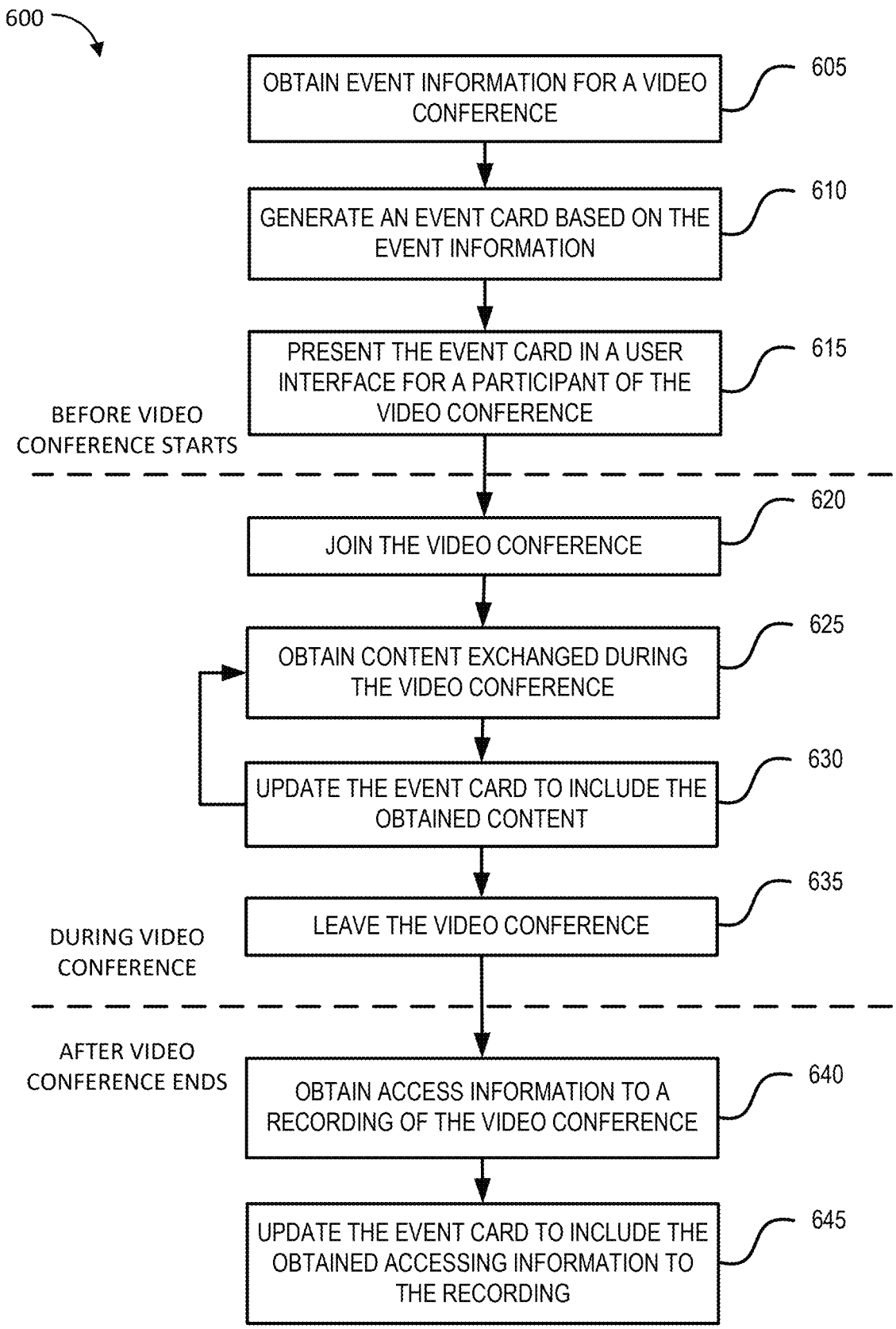
FIG. 6 shows a flowchart of an example process for adding content of a video conference to an event card created for the video conference before, during and after the conference, according to certain aspects of the present disclosure.

Referring now to FIG. 6, FIG. 6 shows a flowchart of an example process 600 for adding content of a video conference generated before, during and after the conference to an event card created for the video conference, according to certain aspects of the present disclosure. The client device 340 can be configured to implement operations depicted in FIG. 6 by executing suitable program code (e.g., the client application 302 and/or the meeting client application 304). The software or program code may be stored on a non-transitory storage medium (e.g., on a memory device). The process depicted in FIG. 6 and described below is intended to be illustrative and non-limiting. Although FIG. 6 depicts the various processing blocks occurring in a particular sequence or order, this is not intended to be limiting. In certain alternative embodiments, the blocks may be performed in some different order, or some blocks may also be performed in parallel. For illustrative purposes, the process 600 is described with reference to certain examples depicted in the figures. Other implementations, however, are possible. FIG. 6 will be described in conjunction with FIGS. 7 and 8.

At block 605, the process 600 involves obtaining event information 314 for a video conference. Similar to block 405 of the process 400 described in FIG. 4, the event information 314 can be obtained from a calendar service 306 and includes information such as the description of the video conference, attachments associated with the video conference, the scheduled time of the video conference, participants of the video conference, and so on. The event information 314 can further include the respective RSVP responses (e.g., whether a participant has accepted or declined the invitation to attend the meeting) of the invited participants. Based on the event information 314, the client application 302 can determine the expected participants of the video conference. The expected participants can be determined to include, for example, the participants who have accepted the meeting invitation or the participants who have not rejected the invitation. For each of the participants, the client device 340 can further obtain the user information such as the name, location, contact information of the participant, and so on.

Figure 7:
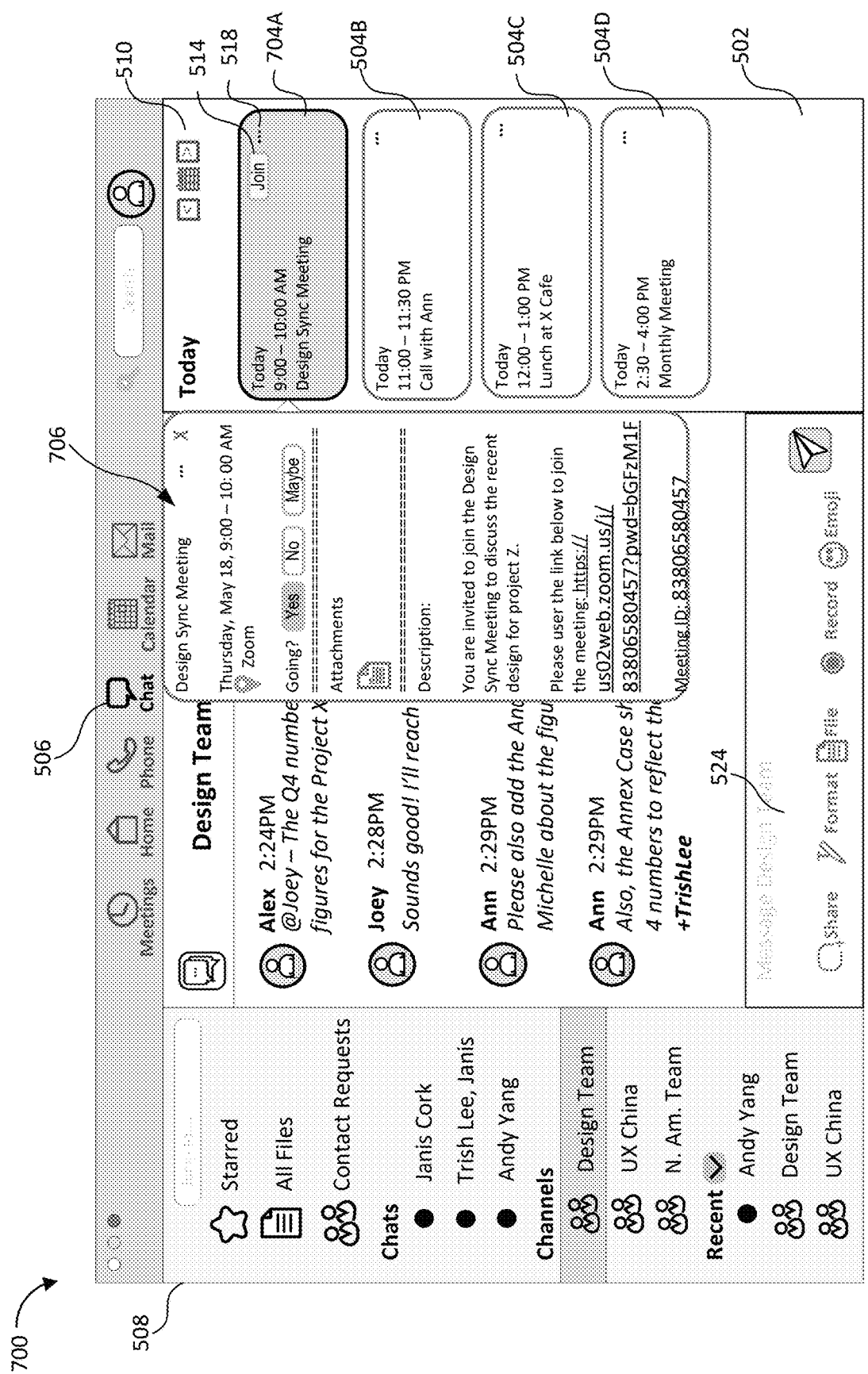
FIG. 7 shows an example of a user interface presented on a computing device associated with a participant of a video conference for presenting an event card for the video conference, according to certain aspects of the present disclosure.

At block 610, the process 600 involves generating an event card 312 based on the event information 314. At block 615, the process 600 involves presenting the event card 312 in the user interface of the client application 302 on a client device 340 associated with a participant of the video conference. FIG. 7 shows an example of a user interface 700 containing an event card 312 for a video conference, according to certain aspects of the present disclosure. FIG. 7 is based on the user interface 500 depicted in FIG. 5, where the user interface shows the chat functionality provided by the client application 302 and the side bar 502 shows the event cards for various events scheduled for the current day. Different from the event card 504A shown in FIG. 5, the event card 704A for the same "Design Sync Meeting" shows the information before the meeting starts (e.g., before any participant joins the meeting), such as the date, time, and title of the meeting. A more detailed event card 706 is shown when the user interface control 518 is activated. In the detailed event card 706, more information about the meeting is shown, such as the RSVP status, the location, the attachments, the description, the link to the meeting, and so on.

Figure 8:
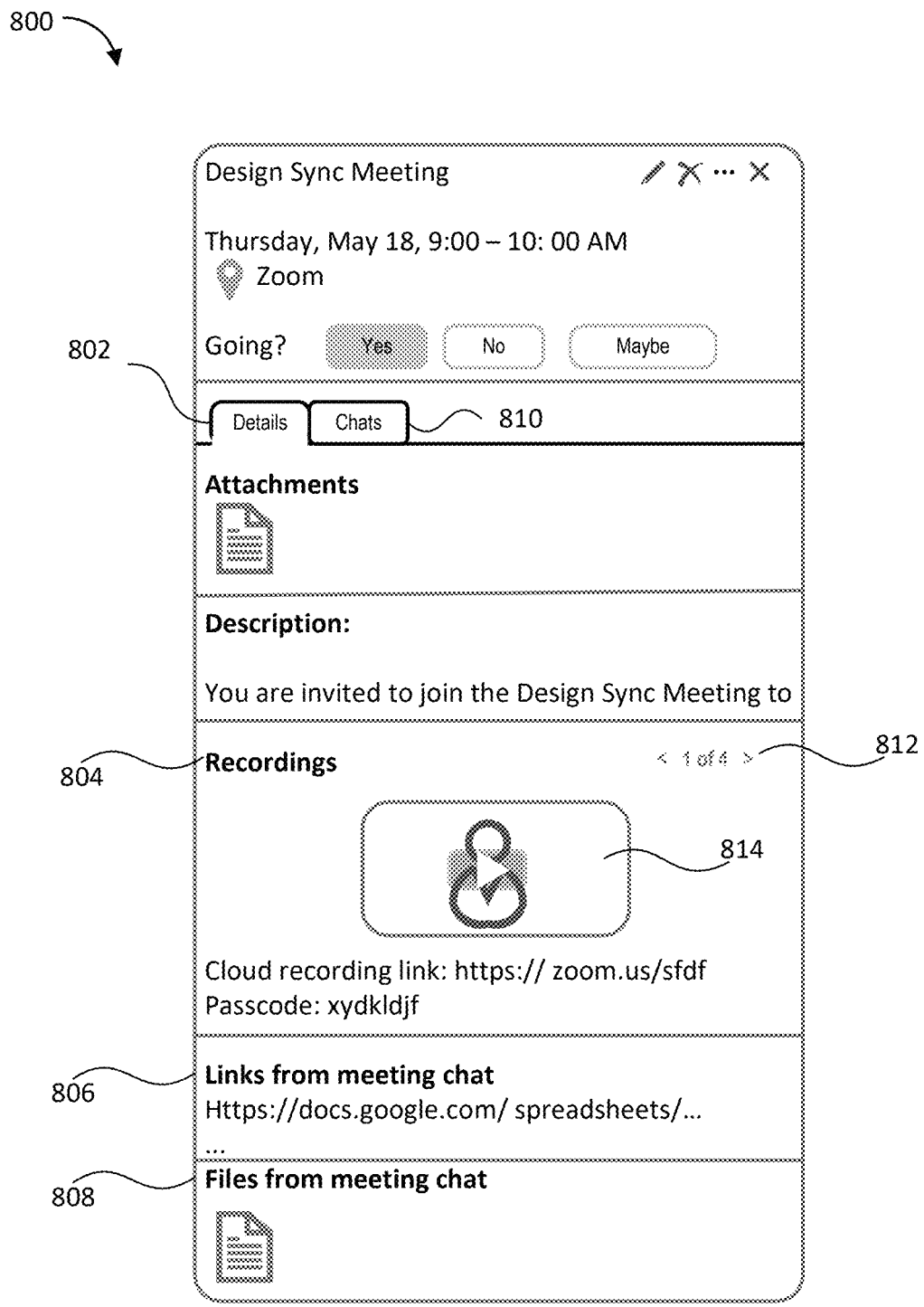
FIG. 8 shows an example of a user interface of an event card for a video conference, according to certain aspects of the present disclosure.

Referring back to FIG. 6, the process 600 involves joining the video conference at block 620 and obtaining content exchanged during the video conference at block 625, such as chat messages and files. In some examples, the meeting content can be obtained by communicating with the chat and video conference provider 310 or another server that has access to the meeting content, such as a backend server 336. The obtained chat messages 332 can be further parsed to identify hyperlinks mentioned therein. At block 630, the process 600 involves updating the event card to include the obtained content. FIG. 8 shows an example of a detailed event card 800 updated from the detailed event card 706 in FIG. 7 to include content exchanged during the video conference. As shown in FIG. 8, the detailed event card 800 includes two tabs: a "Details" tab 802 and a "Chats" tab 810. In addition to the information shown in the detailed event card 706, the "Details" tab 802 shows the links extracted from the meeting chat messages 332 in a new section 806 and files exchanged through meeting chats in the new section 808. The "Chats" tab 810 is configured to show the text messages in the meeting chat messages 332. In some implementations, the detailed event card 800 is updated each time a new chat message or file is obtained at the client device 340. In other implementations, the detailed event card 800 is updated after a batch of new chat messages or files are obtained at the client device 340, such as a predetermined amount of data is received. In further implementations, the detailed event card 800 is updated once after the meeting is over to include all the content exchanged during the meeting. Other implementations are also possible.

Referring back to FIG. 6, the process 600 involves leaving or exiting the video conference at block 635, for example, when receiving a command to leave the meeting by the user clicking on a leave meeting button in the video conference user interface. At block 640, the process 600 involves obtaining access information to the recording of the video conference after the video conference is over. This block is performed if the video conference or a portion thereof was recorded during the meeting. The client application 302 can communicate with, for example, the backend server 336 to obtain the access information to the meeting recording 334 when it is available, such as the link to the recording and the passcode to access the recording. At block 645, the process 600 involves updating the event card to include the obtained access information of the meeting recording. The detailed event card 800 shown in FIG. 8 illustrates an example of the updated event card. As shown in FIG. 8, the event card 800 also includes a "Recordings" section 804 for displaying a preview 814 of the recording and the access information including the link of the recording and the passcode. A separate window can be opened if the preview 814 is activated to playback the recording. If there are multiple meeting recordings, the "Recordings" section 804 also includes a user interface control 812 to allow a user to access different recordings from the same "Recording" section 804 of the detailed event card 800.

Figure 9:
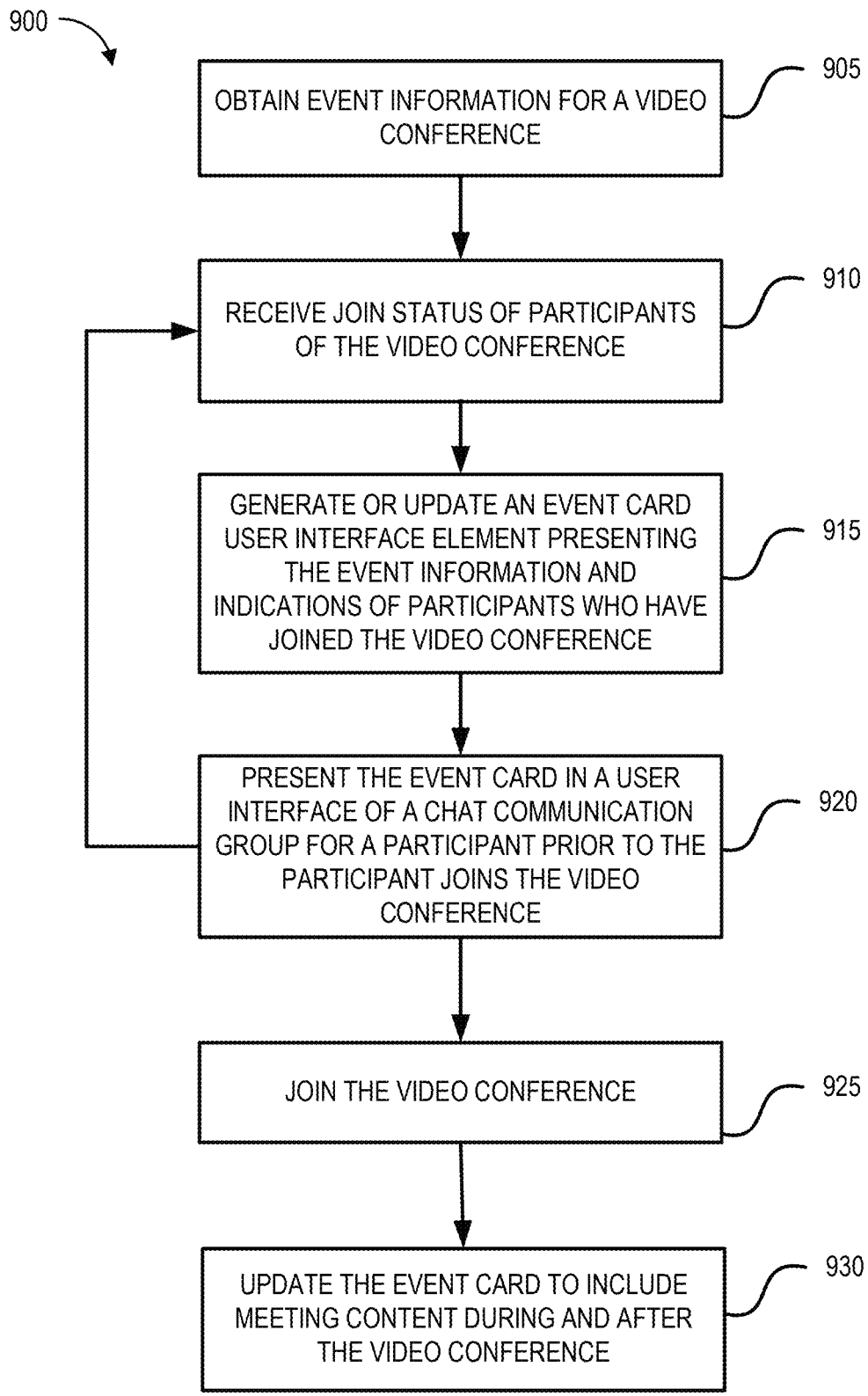
FIG. 9 shows a flowchart of an example process for presenting an event card for a video conference in a chat communication group, according to certain aspects of the present disclosure.

FIG. 9 shows a flowchart of an example process 900 for presenting an event card for a video conference in a chat communication group, according to certain aspects of the present disclosure. The client device 340 can be configured to implement operations depicted in FIG. 9 by executing suitable program code (e.g., the client application 302 and/or the meeting client application 304). The software or program code may be stored on a non-transitory storage medium (e.g., on a memory device). The process depicted in FIG. 9 and described below is intended to be illustrative and non-limiting. Although FIG. 9 depicts the various processing blocks occurring in a particular sequence or order, this is not intended to be limiting. In certain alternative embodiments, the blocks may be performed in some different order, or some blocks may also be performed in parallel. For illustrative purposes, the process 900 is described with reference to certain examples depicted in the figures. Other implementations, however, are possible. FIG. 9 will be described in conjunction with FIGS. 10 and 11.

At block 905, the process 900 involves obtaining event information 314 for a video conference. As discussed above with respect to FIG. 4, the event information 314 can be obtained from the calendar service 306 and includes information such as the description of the event, attachments associated with the event, the scheduled time of the event, participants of the event, and so on. The event information 314 can further include the respective RSVP responses (e.g., whether a participant has accepted or declined the invitation to attend the meeting) of the invited participants. Based on the event information 314, the client application 302 can determine the expected participants of the video conference. The expected participants can be determined to include, for example, the participants who have accepted the meeting invitation or the participants who have not rejected the invitation. For each of the participants, the client device 340 can further obtain the user information such as the name of the participant, location of the participant, contact information of the participant and so on.

At block 910, the process 900 involves receiving participant join status 318. The join status 318 of the participants can be received from the chat and video conference provider 310. In some examples, the chat and video conference provider 310 pushes the participant join status 318 to the client application 302 whenever there is an update, such as when a participant joins the meeting, or a participant leaves the meeting. In other examples, the chat and video conference provider 310 pushes the participant join status 318 to the client device 340 periodically, such as every minute.

At block 915, the process 900 involves generating an event card 312 or updating an existing event card 312 for the video conference to include the event information and an indication of the participants who have joined the meeting before all the participants or the expected participants join the meeting. The generation or update of the event card 312 to include the indication of the participants who have joined the meeting can start once the first participant joins the meeting. The indication can include, for example, an icon of the joined participant or an image of the joined participant. In some examples, the client device 340 may further receive a live video of the meeting from the chat and video conference provider 310 which can be presented in the event card 312 in the user interface before the user joins the meeting.

Figure 10:
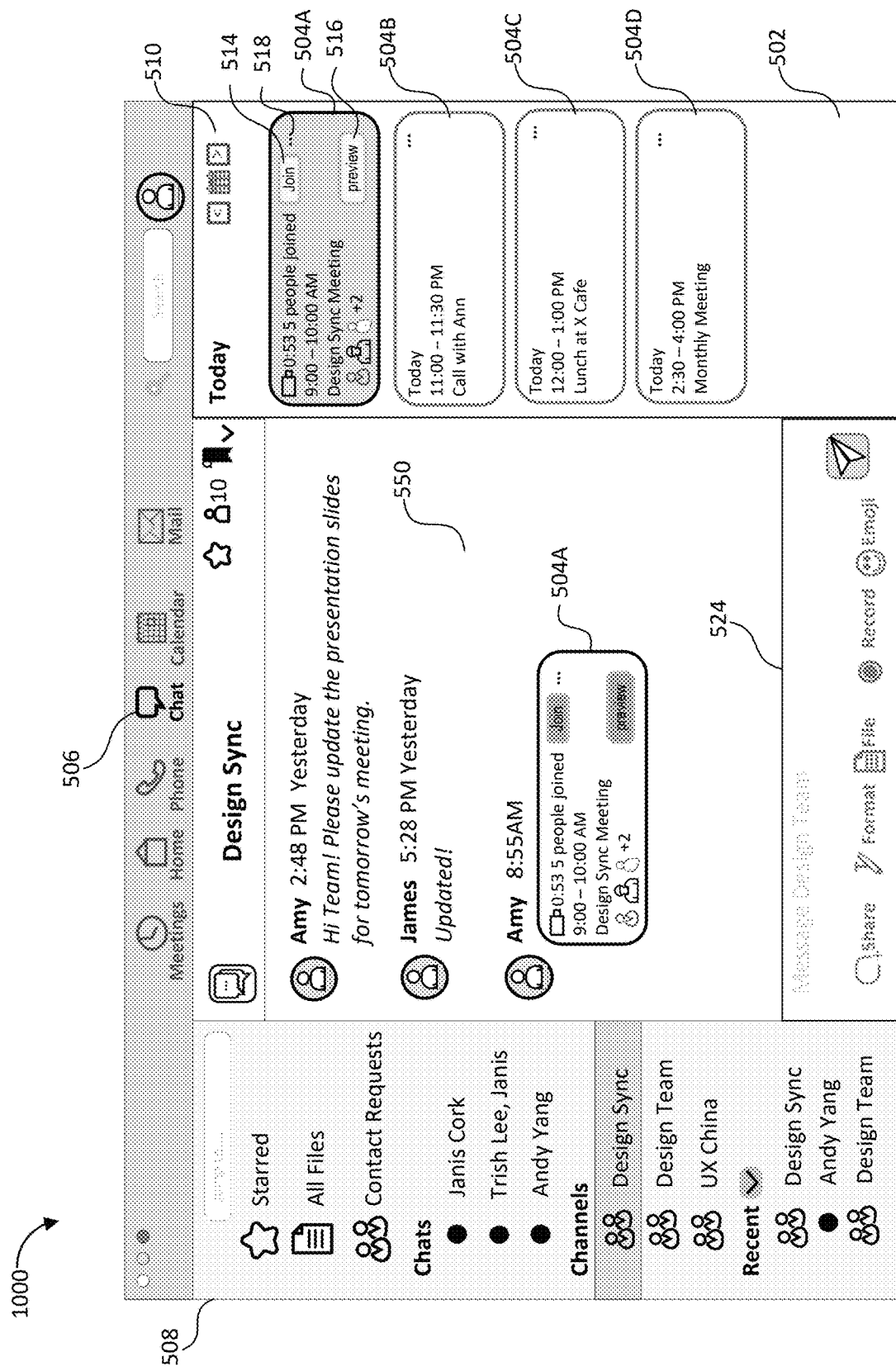
FIG. 10 shows an example of a user interface presented on a computing device associated with a participant of a video conference for presenting an event card for the video conference in a chat communication group before the video conference is over, according to certain aspects of the present disclosure.

At block 920, the process 900 involves presenting the event card in a user interface of a chat communication group on the client device 340 prior to a participant associated with the client device 340 joins the meeting. The chat communication group can be the chat communication group created for the video conference. FIG. 10 shows an example of a user interface 1000 of a chat channel created for the video conference. The user interface 1000 in FIG. 10 is based on the GUI 500 shown in FIG. 5. Compared with the user interface shown in FIG. 5, the user interface 1000 adds a chat channel "Design Sync" that is created for the upcoming video conference "Design Sync Meeting." The chat channel may be created when the meeting is scheduled. When the event card 504A is updated to include an indication of participants who have joined the meeting, the event card 504A is also presented in the chat channel as shown in FIG. 9.

While the event card 504A may be generated by the respective client devices of the participants of the video conference, presenting the event card 504A in the chat channel may be performed by the client device of the host of the video conference and broadcast to other client devices by the chat service 350 so that one event card is shown in the chat channel.

Figure 11:
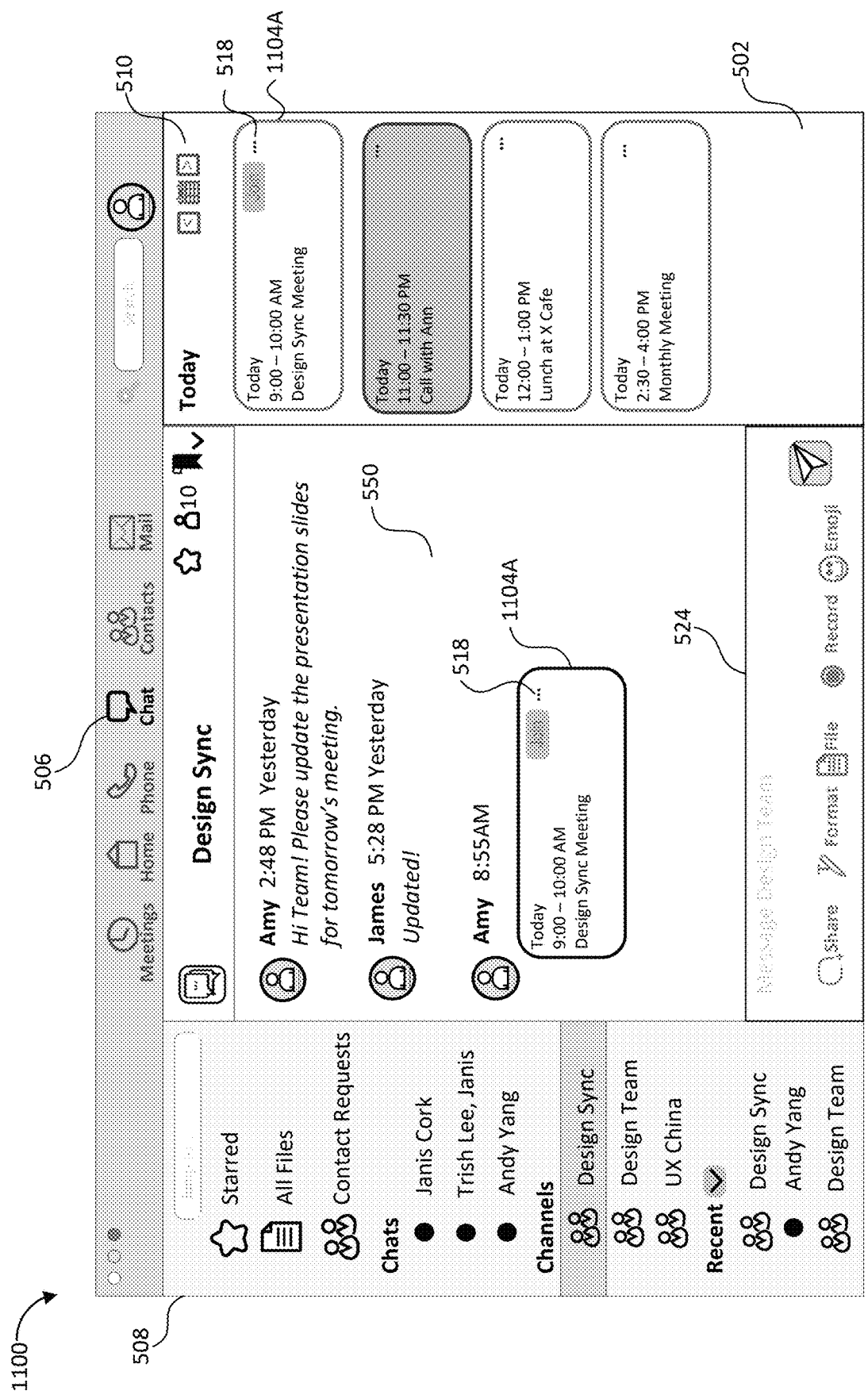
FIG. 11 shows an example of a user interface presented on a computing device associated with a participant of a video conference for presenting an event card for the video conference in a chat communication group after the video conference is over, according to certain aspects of the present disclosure.

Referring back to FIG. 9, the process 900 involves repeating blocks 910-920 each time an update of the participant join status is received. At block 925, the process 900 involves joining the video conference. Based on the information in the event card 312, such as who has joined the meeting, the user of the client device 340 (e.g., the host of the video conference) may decide to join the meeting, such as by clicking on the join button 514 on the event card. Once the user requests to join the meeting, the client application 302 can launch the meeting client application 304 to provide the functionality of the video conferencing as discussed above. The event card 312 can be updated until all the expected participants join the meeting or when the host closes the meeting for joining (i.e., no more participants are allowed to join). FIG. 11 shows an example of the event card 1104A presented in the chat communication group for the video conference after the video conference is closed for joining. At block 930, the process 900 involves updating the event card to include meeting content during and after the video conference as discussed above with respect to blocks 620-635 of FIG. 6. Similar to the event card shown in FIG. 7, a more detailed event card such as that shown in FIG. 8 will be displayed if the user interface control 518 is activated either from the event card 1104A in the side bar 502 or the event card 1104A in the chat channel. In some implementations, the event card in the chat communication group is synchronized with the event card in the side bar.

Figure 12:
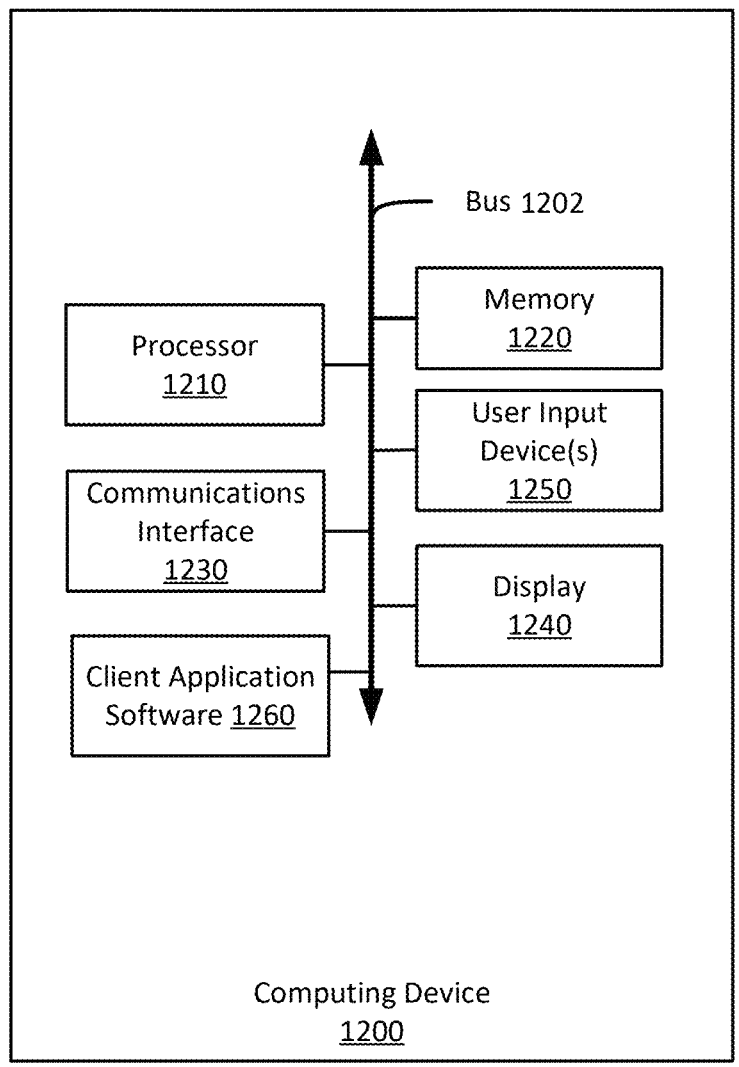
FIG. 12 shows an example computing device suitable for performing certain aspects of the present disclosure.

Referring now to FIG. 12, FIG. 12 shows an example computing device 1200 suitable for performing certain aspects of the present disclosure. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more processes for enriching meeting assets for video conferencing, such as part or all of the example process 400 described above with respect to FIG. 4, or the example process 600 described above with respect to FIG. 6, or the example process 900 described above with respect to FIG. 9. For example, the client application software 1260 provided on the computing device 1200 may provide instructions for performing one or more steps of the processes 400, 600, or 900 for enriching meeting assets for video conferencing. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: A method performed by a computing device associated with a participant of a video conference, the method comprising: obtaining event information for a video conference inviting a plurality of participants comprising the participant; generating an event card based, at least in part, upon the event information; presenting the event card in a user interface on the computing device associated with the participant of the video conference; in response to receiving a command to join the video conference, joining the video conference; obtaining content exchanged among two or more of the plurality of participants during the video conference; and updating the event card presented in the user interface to include the obtained content.

Example #2: The method of Example #1, further comprising: in response to receiving a command to exit the video conference, exiting the video conference; obtaining access information to a recording of the video conference; and updating the event card presented in the user interface to include the obtained access information to the recording.

Example #3: The method of Example #1-2, wherein the access information comprises one or more of a link to the recording of the video conference or a password for accessing the recording Example #4: The method of Examples #1-3, wherein the content exchanged among two or more of the plurality of participants during the video conference comprises one or more of a file or a text message exchanged as chat messages.

Example #5: The method of Examples #1-4, further comprising: parsing the chat messages to extract a hyperlink; and updating the event card to include the hyperlink.

Example #6: The method of Examples #1-5, wherein the file comprises a document, an image, a video, or an audio, and wherein the file is obtained from a file server separate from a video conference provider configured to establish the video conference.

Example #7: The method of Examples #1-6, wherein the event information comprises one or more of a description of the video conference, a scheduled time of the video conference, or an attachment associated with a calendar event involving the video conference; and wherein the event information is obtained from a calendar service managing events in a calendar associated with the participant.

Example #8: The method of Examples #1-7, further comprising obtaining user information for the plurality of participants, wherein the event card further comprises the user information of the plurality of participants.

Example #9: The method of Examples #1-8, wherein joining the video conference is performed by activating a meeting client application in the computing device.

Example #10: a non-transitory computer-readable medium; a communications interface; and a processor communicatively coupled to the non-transitory computer-readable medium and the communications interface, the processor configured to execute processor-executable instructions stored in the non-transitory computer-readable medium to: obtain event information for a video conference inviting a plurality of participants; generate an event card presenting at least the event information; present the event card in a user interface on the system; in response to receiving a command to join the video conference, join the video conference; obtain content exchanged among two or more of the plurality of participants during the video conference; and update the event card presented in the user interface to include the obtained content.

Example #11: The system of Example #10, wherein the processor configured to execute further processor-executable instructions stored in the non-transitory computer-readable medium to: in response to receiving a command to exit the video conference, exit the video conference; obtain access information to a recording of the video conference; and update the event card presented in the user interface to include the obtained access information to the recording.

Example #12: The system of Examples #10-11, wherein the content exchanged among two or more of the plurality of participants during the video conference comprises one or more of a file or a text message exchanged as chat messages.

Example #13: The system of Examples #10-12, wherein the processor configured to execute further processor-executable instructions stored in the non-transitory computer-readable medium to: parse the chat messages to extract a hyperlink; and update the event card to include the hyperlink.

Example #14: The system of Examples #10-13, wherein the file comprises a document, an image, a video, or an audio, and wherein the file is obtained from a file server separate from a video conference provider configured to establish the video conference.

Example #15: The system of Examples #10-14, wherein the event information comprises one or more of a description of the video conference, a scheduled time of the video conference, or an attachment associated with a calendar event involving the video conference; and wherein the event information is obtained from a calendar service managing events in a calendar associated with a participant associated with the system.

Example #16: A non-transitory computer-readable medium comprising processor-executable instructions configured to cause one or more processors to: obtain event information for a video conference inviting a plurality of participants; generate an event card presenting at least the event information; present the event card in a user interface on a computing device associated with a participant of the video conference; in response to receiving a command to join the video conference, join the video conference; obtain content exchanged among two or more of the plurality of participants during the video conference; and update the event card presented in the user interface to include the obtained content.

Example #17: The non-transitory computer-readable medium of Example #16, further comprising processor-executable instructions configured to cause the one or more processors to: in response to receiving a command to exit the video conference, exit the video conference; obtain access information to a recording of the video conference; and update the event card presented in the user interface to include the obtained access information to the recording.

Example #18: The non-transitory computer-readable medium of Examples #16-17, wherein the content exchanged among two or more of the plurality of participants during the video conference comprises one or more of a file or a text message exchanged as chat messages.

Example #19: The non-transitory computer-readable medium of Examples #16-18, further comprising processor-executable instructions configured to cause the one or more processors to: parse the chat messages to extract a hyperlink; and update the event card to include the hyperlink.

Example #20: The non-transitory computer-readable medium of Examples #16-19, wherein the event information comprises one or more of a description of the video conference, a scheduled time of the video conference, or an attachment associated with a calendar event involving the video conference; and wherein the event information is obtained from a calendar service managing events in a calendar associated with a participant associated with the one or more processors.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by a computing device associated with a participant of a video conference, the method comprising:
    obtaining, by a client application executed by a client device, event information for a video conference, the video conference having a plurality of invited participants, including the participant;
    generating, by the client application, an event card based, at least in part, upon the event information;
    presenting, by the client application, the event card in a user interface on the computing device associated with the participant of the video conference;
    joining, by the client application, the video conference;
    obtaining, by the client application during the video conference, content exchanged among two or more of the plurality of invited participants during the video conference; and
    updating, by the client application during the video conference, the event card presented in the user interface to include the obtained content.

2. The method of claim 1, further comprising:
    in response to receiving a command to exit the video conference, exiting the video conference;
    obtaining access information to a recording of the video conference; and
    updating the event card presented in the user interface to include the obtained access information to the recording.

3. The method of claim 2, wherein the access information comprises one or more of a link to the recording of the video conference or a password for accessing the recording.

4. The method of claim 1, wherein the content exchanged among two or more of the plurality of invited participants during the video conference comprises one or more of a file or a text message exchanged as chat messages.

5. The method of claim 4, further comprising:
    parsing the chat messages to extract a hyperlink; and
    updating the event card to include the hyperlink.

6. The method of claim 4, wherein the file comprises a document, an image, a video, or audio, and wherein the file is obtained from a file server separate from a video conference provider configured to establish the video conference.

7. The method of claim 1, wherein the event information comprises one or more of a description of the video conference, a scheduled time of the video conference, or an attachment associated with a calendar event involving the video conference; and wherein the event information is obtained from a calendar service managing events in a calendar associated with the participant.

8. The method of claim 1, further comprising obtaining user information for the plurality of invited participants, wherein the event card further comprises the user information of the plurality of invited participants.

9. The method of claim 1, wherein joining the video conference is performed by activating a meeting client application in the computing device.

10. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
  obtain, by a client application, event information for a video conference, the video conference having a plurality of invited participants, including the participant;
  generate, by the client application, an event card presenting at least the event information;
  present, by the client application, the event card in a user interface on the system;
  in response to receiving a command to join the video conference, join, by the client application, the video conference;
  obtain, by the client application during the video conference, content exchanged among two or more of the plurality of invited participants during the video conference; and
  update, by the client application during the video conference, the event card presented in the user interface to include the obtained content.

11. The system of claim 10, wherein the processor is configured to execute further processor-executable instructions stored in the non-transitory computer-readable medium to:
  in response to receiving a command to exit the video conference, exit the video conference;
  obtain access information to a recording of the video conference; and
  update the event card presented in the user interface to include the obtained access information to the recording.

12. The system of claim 10, wherein the content exchanged among two or more of the plurality of invited participants during the video conference comprises one or more of a file or a text message exchanged as chat messages.

13. The system of claim 12, wherein the processor is configured to execute further processor-executable instructions stored in the non-transitory computer-readable medium to:
  parse the chat messages to extract a hyperlink; and
  update the event card to include the hyperlink.

14. The system of claim 12, wherein the file comprises a document, an image, a video, or audio, and wherein the file is obtained from a file server separate from a video conference provider configured to establish the video conference.

15. The system of claim 10, wherein the event information comprises one or more of a description of the video conference, a scheduled time of the video conference, or an attachment associated with a calendar event involving the video conference; and wherein the event information is obtained from a calendar service managing events in a calendar associated with a participant associated with the system.

16. A non-transitory computer-readable medium comprising processor-executable instructions configured to cause one or more processors to:
  obtain, by a client application, event information for a video conference, the video conference having a plurality of invited participants, including the participant;
  generate, by the client application, an event card presenting at least the event information;
  present, by the client application, the event card in a user interface on a computing device associated with a participant of the video conference;
  in response to receiving a command to join the video conference, join, by the client application, the video conference;
  obtain, by the client application during the video conference, content exchanged among two or more of the plurality of invited participants during the video conference; and
  update, by the client application during the video conference, the event card presented in the user interface to include the obtained content.

17. The non-transitory computer-readable medium of claim 16, further comprising processor-executable instructions configured to cause the one or more processors to:
  in response to receiving a command to exit the video conference, exit the video conference;
  obtain access information to a recording of the video conference; and
  update the event card presented in the user interface to include the obtained access information to the recording.

18. The non-transitory computer-readable medium of claim 16,
wherein the content exchanged among two or more of the plurality of invited participants during the video conference comprises one or more of a file or a text message exchanged as chat messages.

19. The non-transitory computer-readable medium of claim 18, further comprising processor-executable instructions configured to cause the one or more processors to:
  parse the chat messages to extract a hyperlink; and
  update the event card to include the hyperlink.

20. The non-transitory computer-readable medium of claim 16, wherein the event information comprises one or more of a description of the video conference, a scheduled time of the video conference, or an attachment associated with a calendar event involving the video conference; and wherein the event information is obtained from a calendar service managing events in a calendar associated with a participant associated with the one or more processors.

* * * * *